United States Patent [19]
Olsen

[11] Patent Number: 5,771,462
[45] Date of Patent: Jun. 23, 1998

[54] BUS ARBITRATION INFRASTRUCTURE FOR DEPLOYMENT OF WIRELESS NETWORKS

[75] Inventor: Claus Michael Olsen, Cortlandt Manor, N.Y.

[73] Assignee: International Business Machines Corporation, Armonk, N.Y.

[21] Appl. No.: 499,534

[22] Filed: Jul. 7, 1995

[51] Int. Cl.[6] .............................. H04B 7/00; H04B 7/20
[52] U.S. Cl. .......................... 455/524; 455/502; 455/517
[58] Field of Search ................................. 455/33.4, 34.1, 455/51.2, 54.1, 56.1, 422, 450, 502, 503, 517, 524; 375/356

[56] References Cited

U.S. PATENT DOCUMENTS

| | | | |
|---|---|---|---|
| 5,023,930 | 6/1991 | Leslie ..................................... | 455/54.1 |
| 5,054,113 | 10/1991 | Jasinski ................................. | 455/51.2 |
| 5,155,859 | 10/1992 | Harris et al. .......................... | 455/51.2 |
| 5,172,396 | 12/1992 | Rose, Jr. et al. ...................... | 455/51.2 |
| 5,287,552 | 2/1994 | Sasuta et al. ......................... | 455/34.1 |
| 5,327,581 | 7/1994 | Goldberg ............................... | 455/51.2 |
| 5,530,915 | 6/1996 | Shaughnessy et al. ................ | 455/51.2 |
| 5,586,119 | 12/1996 | Scribano et al. ...................... | 455/51.2 |

*Primary Examiner*—Reinhard J. Eisenzopf
*Assistant Examiner*—Sam Bhattacharya
*Attorney, Agent, or Firm*—Douglas W. Cameron; Ronald L. Drumheller

[57] ABSTRACT

A method and apparatus for expanding the physical coverage area of a wireless communications network. More specifically, a number of transceivers are connected in a series configuration to a single base station, and each transceiver transmits signals to selected portions (subcells) of the physical coverage area. Each transceiver is connected to a delay unit where all of the delay units are adjusted so that downlink signals transmitted from the single base station will be transmitted from the transceivers to their respective subcells in phase with each other. Since all of the downlink signals from each of the transceivers result from the same downlink signal from the base station and since they are in phase with each other, a wireless unit anywhere in the physical coverage area will receive a downlink signal which is error free. Further, with this invention, when uplink signals are transmitted simultaneously from a number of wireless units in different subcells of the physical coverage area to the transceivers, the selection units will instantaneously select one and only one uplink signal to be received by the base station. Any one of the other simultaneously transmitted signals will be rejected throughout the duration of their signal.

18 Claims, 8 Drawing Sheets

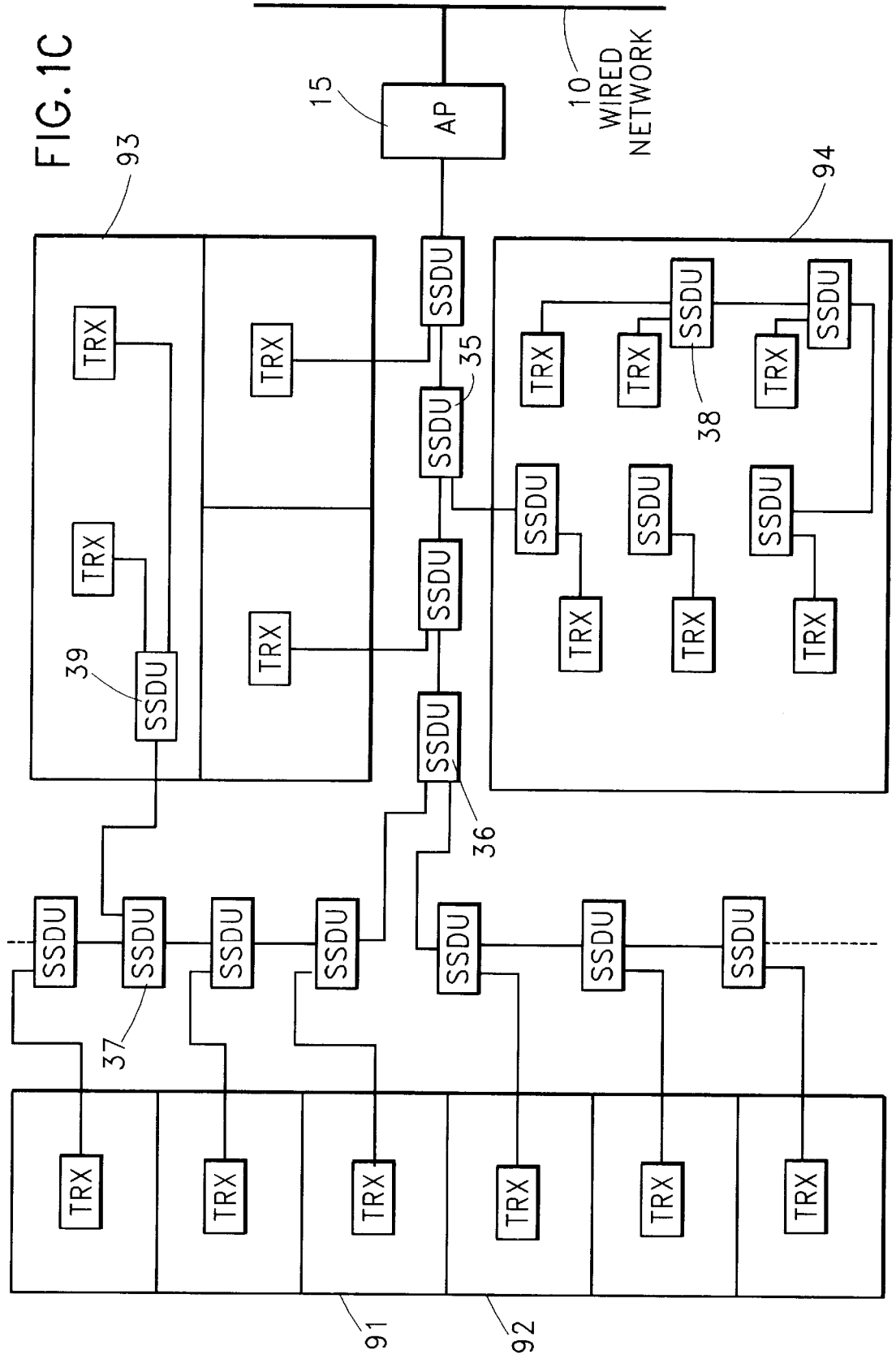

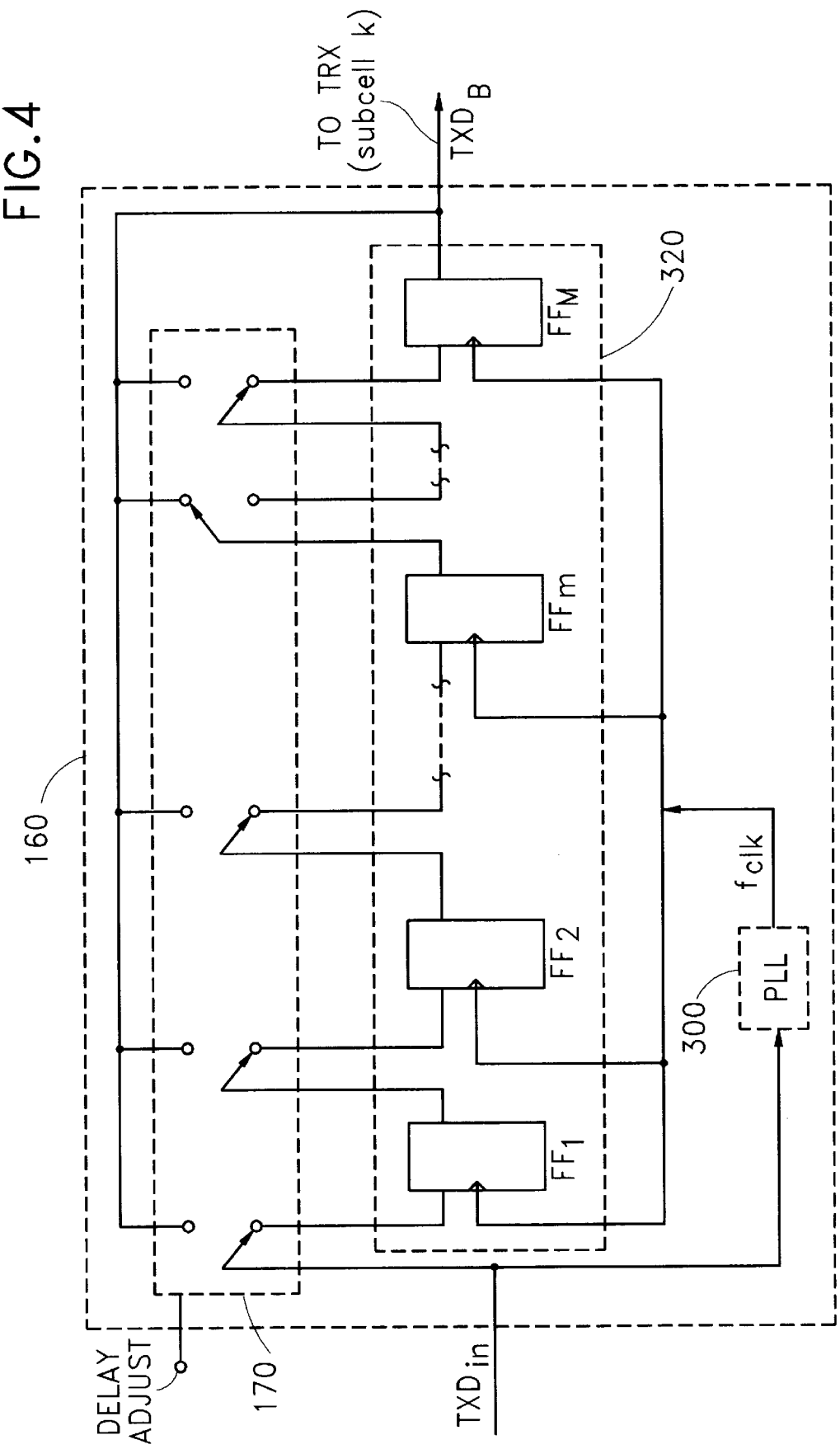

BUS ARBITRATION INFRASTRUCTURE FOR DEPLOYMENT OF WIRELESS NETWORKS

DESCRIPTION

TECHNICAL FIELD

This invention relates to a wireless communications network. More specifically, the physical coverage area of a single base station is increased by using multiple tranceivers where each transceiver is connected to appropriate delay and selection units.

BACKGROUND OF THE INVENTION

It is an object of this invention to reduce the cost of a wireless communications network by expanding the physical coverage area of a single base station. More specifically by introducing appropriate delays in signals being transmitted from the base station to the number of transceivers which transmit data to wireless units and by selecting uplink signals to be received by the base station, the physical coverage area can be increased by a factor of, for example, 10.

It is an object of this invention to provide an infrastructure for a wireless system that is very simplistic and inexpensive, that is not geared for any specific room geometry, and which enables seamless expansion of the cell size.

It is another object of this invention to provide an infrastructure that supports communications rates in the above 1 Mbps regime by offering instantaneous uplink signal selection and downlink signal delay compensation at the physical layer level with minimal impact on the throughput and delay performance.

It is further an object to provide a mechanism for the base station to handle multiple request-to-send requests.

This invention supports peer-to-peer communication as well as communication with hosts on a wired network through an access point. In a preferred embodiment, the invention is aimed at non-directed infrared wireless local area network systems where the transceivers (also known as transponders) are connected to the base station, which in this case is a wired network access point (AP), via a single cable. The selection of a particular wireless units uplink signal over another's units is done at the transceiver location.

Accordingly, this invention provides a method and apparatus for broadcasting a signal from an base station in wireless communications network. A number of transceivers are connected to each other and to the base station. Each of the transceivers transmit and receive signals From wireless units in respective subcells of a physical coverage area which is increased by this invention. With this invention signals transmitted from the base station to the transceivers are delayed so that signals transmitted from each of the transceivers are in phase with each other so that each of the wireless units anywhere in the coverage area will receive the signals without errors.

In a further improvement of this invention only one uplink signal from one of the subcells will be selected for transmission to the base station, and all of the simultaneously transmitted signals (if any) from non-selected subcells will be rejected throughout the duration of their signal.

DESCRIPTION OF THE PRIOR ART

When preparing an area for wireless communication, some key aspects of the wireless infrastructure are costs, configurability, and performance.

In terms of cost, it is most attractive to have a single base station (BS) serve multiple transceivers (TRX) than to have a dedicated AP for each TRX, since the BS is by far the most expensive part of the wireless infrastructure. In this fashion, the overall coverage area, or cellsize, served by the BS has been increased in size without significantly increasing the costs. Thus, the cell covered by the BS has really been partitioned into a number of subcells, each physically served by an TRX. An example of such a wireless infrastructure was first proposed in IBM Technical Disclosure Bulletin, "Infrared Microbroadcasting Network for In-House Data Communication", Vol. 24, No. 8, pp. 4043–4046, January 1982 by F. Gfeller. Gfeller describes an infrared microbroadcasting network which is basically a star configuration with a central controller. The controller in turn can be connected to an access point (AP). Each TRX has a dedicated TRX port at the controller to which it is connected through a cable. The controller governs the selection of uplink packets and subsequent broadcasting of the packets.

In terms of configurability of the subcells, the question of how to position the TRX units without degrading performance, is a particularly important one for infrared (IR) wireless systems due to IR systems inherently small subcells. The smaller the subcell the more subcells are needed to provide uniform coverage in a room. The specific location of the TRX units imposes a potential problem during broadcasting of packets into the subcells. Suppose a wireless unit (WU) is right between two TRX units. Then, the WU will receive two signal contributions, one from each of the TRX units. If the signal from one of the TRX units is delayed with respect to the other TRX unit, the packet may be destroyed at the WU due to destructive signal interference. What determines whether the two signal contributions are delayed with respect to each other are the cable delays between the TRX units and the central distribution point, e.g., the controller in Gfeller's case. The prior art does not disclose how to provide appropriate and configurable delays to eliminate destructive signal interference due to subcell overlap. In a star configuration like Gfeller's microbroadcasting network, the way to solve the problem is to ensure equal cable lengths. But there are significant drawbacks to such an approach. First of all, long cables can be detrimental to the signal waveform due to the larger capacitance of a long cable. Secondly, the TRX unit which is farthest away from the central distribution point will determine the cable length to all the other TRX units. This is not only wasteful but it also makes further expansion of the cellsize difficult if the added TRX units require even longer cables. Thirdly, the number of cables that can be attached to a controller may be limited. There is probably a way to expand the bus of the controller; however, the density of cables at the controller location and the branching out of cables in all directions are not particularly attractive. Envision the cable configuration when preparing a long hallway, or a row of offices, for wireless service. The prior art does not teach how to install, maintain and expand such an infrastructure in an inexpensive, practical and seemless manner.

Most wireless systems employ the well known carrier sense multiple access (CSMA) method for accessing the wireless medium, at least in the uplink. It is easy to envision that due to the larger cellsize, this will create an exaggerated hidden node problem. The hidden node problem is the phenomenon of two (or more) WUs which can communicate with the BS but are located in two different subcells and therefore can not sense each others signals. Furthermore, due to the increased population of WU's, there will be more competition for seizing the channel. The net result of this is an increased amount of collisions and wasted packets. This in turn degrades the throughput performance. This problem was addressed in "A multi-star broadcast network for local-area communication" by F. Closs et al. Closs solves part of this problem by letting the controller (i.e. his star node) detect if one or more uplink signals are present in the TRX port. If so, a broadcast access control circuit will ensure that only one of the uplink signals are selected for broadcast. Thus, collision between uplink packets from two different subcells is avoided. Closs's access control circuit also guarantees that any packet arriving while the broadcast channel is busy is completely rejected (ignored). Thus, truncated packets are not selected for broadcast. What the prior art does not teach is how to do the selection/rejection of a packet without having to wait for the selection circuit (i.e. the signal detector and access control circuits) to set up the connection to the broadcast channel. This may not be a serious problem in a star node, but it is a problem in an infrastructure where a packet may have to pass through multiple selection circuits.

In most wireless systems, it is not possible to detect a collision. To reduce the probability of collisions within a subcell and in general to provide a more reliable and efficient data link, CSMA often coexists with a collision avoidance (CA) scheme. This was first reported by P. Karn in "MACA—A new channel access method for packet radio" at ARRL/CRRL Amateur Radio 9th Computer Networking Conference, Sep. 22, 1990. Today there exist several versions of the CA scheme. In general, there are two parts to the CA scheme. The first part incorporates a random backoff time where the WUs wait a random time after they sense a free channel before they transmit their packets. This significantly reduces the number of collisions. Though, collisions can still happen, and packets also get wasted for other reasons (e.g. noise interference, signal attenuation). The second part of the CA scheme typically includes the following exchange of packets: WU sends request-to-send (RTS), AP responds clear-to-send (CTS), WU sends data packet (DATA), and AP acknowledges data reception (DACK). In this way, the WU will assume that if it does not receive the CTS or DACK packet within a given time that the RTS or DATA packet was lost, and it will transmit the RTS or DATA packet again. Since, the other WU's see the same packet exchange it will prevent them from trying to seize the channel until they detect the DACK packet or until a timer expires. However, there is a time interval (commonly referred to as the collision window) between the RTS and the CTS response in which WU's in the other subcells can send out RTS packets as they don't know about the initial RTS until the detect the broadcasted CTS response. These RTS packets will all go to waste since the BS can only handle one RTS request at a time. In addition, these post-RTS packets may collide with the CTS response in their respective subcells. One way to significantly reduce the collision window and thus prevent submission of RTS packets in the other subcells, is to instantly broadcast the uplink packets into all subcells. Gfeller does this in his microbroadcasting network. He is able to do this because the wireless uplink and downlink channels are not shared; he has a duplex channel.

What the prior art does not teach is how to alert the population of wireless units during uplink transmission in the case of a shared wireless uplink and downlink channel. Prior art does not either disclose how to service multiple RTS requests at the BS. Currently, the BS does not know what to do with a second RTS packet until it has processed the first RTS request. Accumulation of multiple RTS requests at the BS may provide for a more orderly packet exchange between the wireless units and the BS and therefore for an improvement in the delay/throughput performance under large traffic conditions.

Another example of how to expand the cellsize was proposed in U.S. Pat. No. 4,402,090, issued Aug. 30, 1983, F. Gfeller et al. In this patent, a plurality of satellite stations are connected in a serial bus fashion to the central cluster controller. However, since access to the bus is regulated by a medium access protocol, and since the satellite stations perform functions such as address recognition, frame delimiter check, CRC error checking etc, this method of expanding the coverage area is actually a data link layer approach. The drawback of a data link approach is as follows. Due to buffering of packets in the satellite stations, the inevitable delay associated with getting access to the bus, packet processing, collisions on the bus etc, the throughput and delay performance will clearly be degraded. Furthermore, the introduction or logic signal processing circuits in each satellite station will increase the cost per satellite station over that of a simple transceiver. Thus, from the standpoint of costs, simplicity and performance, it is not attractive to expand the cellsize at the data link level.

BRIEF DESCRIPTION OF THE DRAWINGS

FIG. 1c schematically illustrates how the wireless infrastructure can be deployed for various room configurations.

FIG. 4 schematically illustrates a possible implementation of the delay circuit.

DESCRIPTION OF THE PREFERRED EMBODIMENT

Figure 1A:
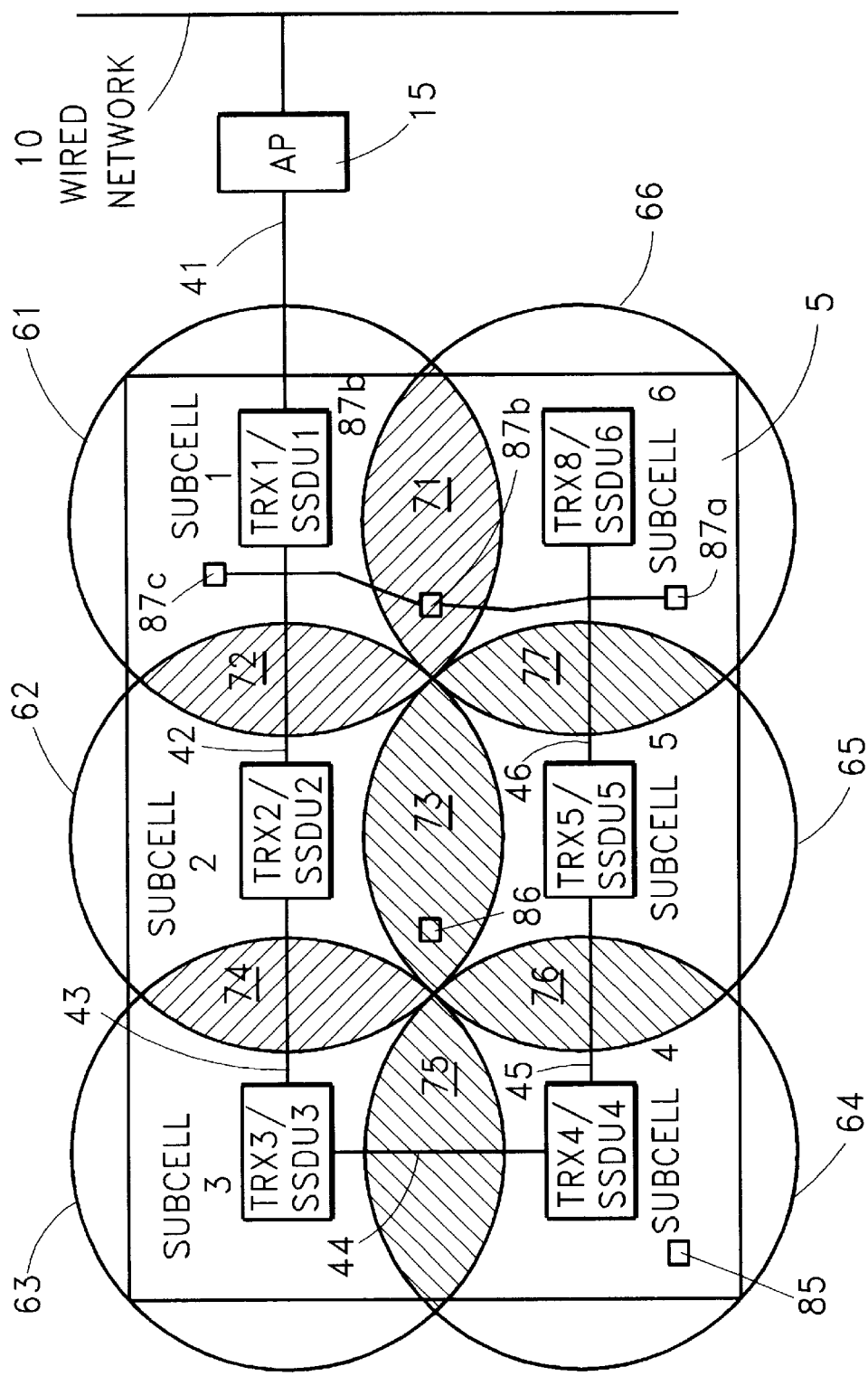
FIG. 1a schematically illustrates a scenario in which a room has been prepared for infrared (IR) wireless data communication with a wired network via a base station.
Figure 1B:
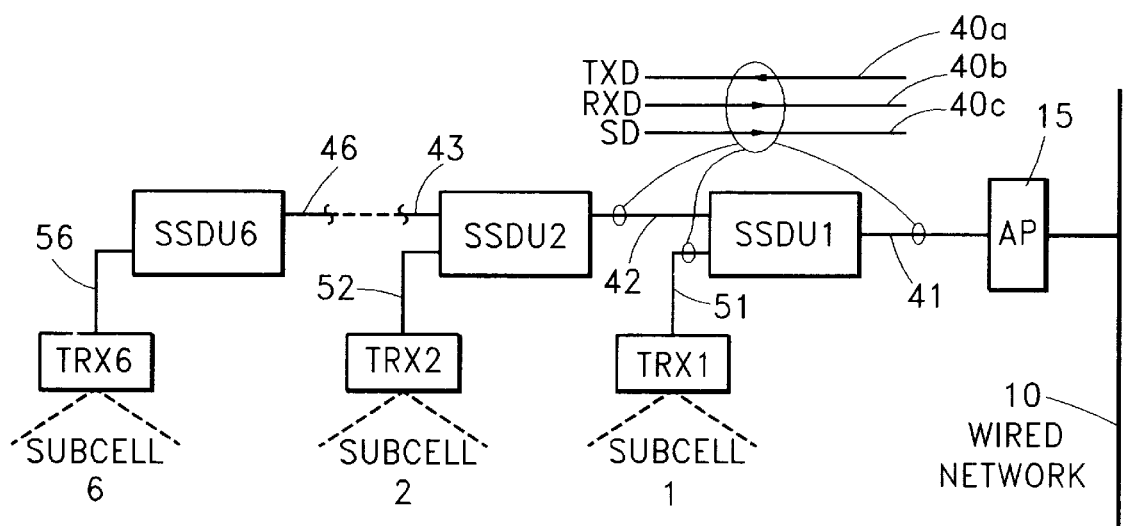
FIG. 1b schematically illustrates the wireless infrastructure deployed for the room in FIG. 1a in more detail.

FIG.1a depicts a typical scenario in which a room (5) has been prepared for infrared (IR) wireless data communication with a wired network (10) via the access point (15). The room requires six IR TRX units, $TRX_1$–$TRX_6$, to provide uniform coverage. Thus, there are six subcells (61–66) in the room. FIG. 1b shows the wireless infrastructure in more detail, i.e. TRX units, SSDU's, cables (41–46) and cables (51–56). As seen, each TRX is connected to an Signal Selector and Delay Unit (SSDU) through the cables (51–56). The SSDU's are in turn interconnected with the cables (42–46) while the cable 41 connects the first SSDU to the access point (15). The Signal Selector and Delay Unit (SSDU) is shown in greater detail in FIG. 2. Briefly, the SSDU performs a selection function in the uplink allowing only one TRX unit at a time to transmit a received signal to the access point (AP), and it performs a delay function in the downlink ensuring that signals are transmitted into the subcells in a synchronized fashion. The SSDU has three cables connected to it as shown in FIG. 1b. Each cable has three signal lines: Transmit data (TXD)) (40a) which contains the broadcast signal from the AP, and Receive data (RXID) (40b) and Signal Detect (SD) (40c) which, respectively, contain the uplink signal and associated SD from one of the TRX units. The specifics of the SSDU functions will be described in detail below.

It should be pointed out that the SSDU provides for a simple and expandable infrastructure that enables wireless access to a wired network, or peer-to-peer communication, for all sorts of room configurations. Basically, the SSDU is a distribution/branching point. Various ways of interconnecting SSDU's and TRX's for the purpose of providing wireless coverage to different types of room configurations is shown in FIG. 1c. However, if an SSDU is the last SSDU, see for example the SSDU's (38, 39), two TRX units may be connected to the SSDU's. If the SSDU is used as a branching point, see for example the SSDU's (35, 36, 37), two other SSDU's are connected to it. FIG. 1c shows that the SSDU provides wireless access to a wired network for individual offices (91,92), larger offices (93), conference rooms (94) etc. The SSDU makes this possible with a minimum amount of cabling involved, a minimum amount of time necessary to install the infrastructure, and with the assurance of an effortless expansion or reconfiguration of the infrastructure. Because the cable lengths between successive SSDU's will in general be short the signals propagating on the cables will not be significantly affected by the capacitive load of the cable as the signal is reamplified, or perhaps even regenerated, at each SSDU before it is passed on to the next SSDU or TRX.

The presentation of the preferred embodiment is divided into three parts: Uplink, Downlink, Hidden Nodes and Multiple RTS systems. In the preferred embodiment, the infrared (IR) system is of the non-directed type (either diffused or line-of-sight type). Such a system will have overlapping areas (71–77) between the subcells due to the in general circular shape of the individual subcell boundaries (61–66). The system is operating above 1 Mbps employing a 16-Pulse Position Modulation (16-PPM) technique. The wireless channel is accessed according to the Carrier Sense Multiple Access (CSMA) method with some sort of Collision Avoidance (CA) built in. The wireless channel is shared between the uplink and downlink. Thus, the TRX units transmit IR signals to the wireless units (WU) (85–87) and receive IR signals from the WU's on the same infrared channel. Note, that the two terms, access point (AP) and controller, which will be used extensively in the following, can be thought of as a particular configuration of a base station (BS).

UPLINK: The WU's will typically be mobile users. For example the WU (87) may move from a first position (87a) to a second position (87b), which is located in the overlap area (71), and further on to a third position (87c). Thus, the following problem has to be addressed as the WU moves into the overlap area (71). Namely, which of the two TRX units, $TRX_1$ and $TRX_2$, are to be used for transferring the WU's signal to the AP without wasting the packet. Another possible problem is when the WU at position (87a) is transmitting a packet via $TRX_6$ and the WU (85) in subcell 4 starts transmitting a packet via $TRX_4$ before the WU (87a) has completed its transmission. Thus, a provision is taken in the SSDU (100), which is shown in further detail in FIG. 2, to select the uplink signal of only one TRX unit, or said differently, to keep a connection open between a certain TRX and the AP throughout the duration of the packet. This is done in the following way.

Transceivers are usually equipped with a received signal indicator (RS). For example, the RSI could be provided in the form of a Signal Detect (ST)) feature where SD is enabled when the receiver detects the preamble part of an uplink packet. Typically, the SD is enabled after a couple of preamble cycles and will be disabled shortly after the end of the packet. Thus, SD can be used as an indicator whether a packet is present. As seen from FIG. 2, the SSDU takes two SD's as input, $SD_A$ (105a) and $SD_B$ (106a). The SD's are typically supplied from another SSDU, i.e. source A (105), and a TRX unit, i.e. source B (106), though other configurations are possible which will be discussed later. The SD's are used by the decision circuit (200) in FIG. 3a which shows an exploded general view of the decision/connection circuit (130). Based on the transitions of the inputs, the decision circuit generates a selector signal, Q, (133) which in turn is used as input to the connection circuit (270) to connect one of the inputs sources A or B to the output (110). In its simplest form, the decision circuit is a state machine which only changes state when the two SD inputs are logically different. For example, Q=1 is generated when $(SD_A, SD_B)=(0,1)$ and Q=0 when $(SD_A, SD_B)=(1,0)$. When the two inputs are logically alike, i.e. $(SD^A, SD_B)=(1,1)$ or (0,0), Q remains unchanged, i.e. Q(t+1)=Q(t). Such a circuit could be built with one flip-flop, two AND gates and two inverters.

The connection circuit can be designed in a number of ways. In its simplest form, the input sources A (105) and B (106) are both connected to the output (110) via an OR gate. However, once a packet appears at one of the inputs, say the A input (105), the B input (106) is disconnected from the output. Should another signal appear at the B input in the mean time, it will be wasted. Once the packet on the A input is no longer present, the B input is reconnected to the output, and should a packet still be present at the B input, the A input is disconnected from the output. A logical representation of this is $X_{OUT}=X_A \cdot \overline{SD_B} \cdot Q + X_B \cdot \overline{SD_A} \cdot \overline{Q}$ where X is a substitute for either SD or RXD. The alternative way of doing this selection is to keep the inputs disconnected from the output and wait until a packet appears at one of the inputs. Once a packet appears on an input then a connection is set up between that input and the output. (This is basically the mechanism of a telephone circuit switch.) The drawback of doing the selection this latter way is that fragments of the front part of the packet are lost while waiting for the decision/connection circuit to establish a connection to the output. The degree of this packet truncation will depend on the speed of the logic circuits and on the number of SSDU's the packet is passing through on its way to the AP. The advantage of our selection approach is that any packet present at one of the inputs is immediately forwarded to the output in unaltered form. Absolutely no time is wasted in setting up the connection. The decision/connection process is essentially a first-come-first-serve mechanism with no queue. A packet P2 that arrives before the end of an already selected packet P1, is wasted. This is so because the decision circuit (200) only changes state when the two SD inputs (105, 106) become logically different. If at first the SD inputs are $(SD_A, SD_B)=(1,0)$, and therefore the A source signals, $SD_A$ and $RXD_A$, are selected, and then a few microseconds later the SD inputs are $(SD_A, SD_B)=(1,1)$, the A source signals remain the selected signals since Q(t+1)=Q(t). The benefit from this is that when WU (87a) moves to position (87b) in the overlap area (71) in FIG. 1a while transmitting a packet, the WU remains connected to the AP via the $TRX_6$. In a way, this is really a packet/signal capture approach at the physical layer level. Note, a connection between a certain TRX, say TRX$_6$ in FIG. 1a, and the AP is only established if a packet from the TRX arrives at all the SSDU's, SSDU$_1$–SSDU$_6$, before any other packet. This may seem to favor packets originating from the first subcell 61 since a packet from this subcell will arrive at the SSDU, faster than say a packet originating from subcell 6 (66) which will experience the propagation delay of the cables (42–46) before arriving at the SSDU$_1$. However, since the propagation delay between the last SSDU$_6$ and the first SSDU$_1$, is typically in the order of a bit period, this is not of any particular significance assuming the gate delay in the connection circuit (270) is of the same magnitude as the propagation delay of each cable.

Figure 3A:
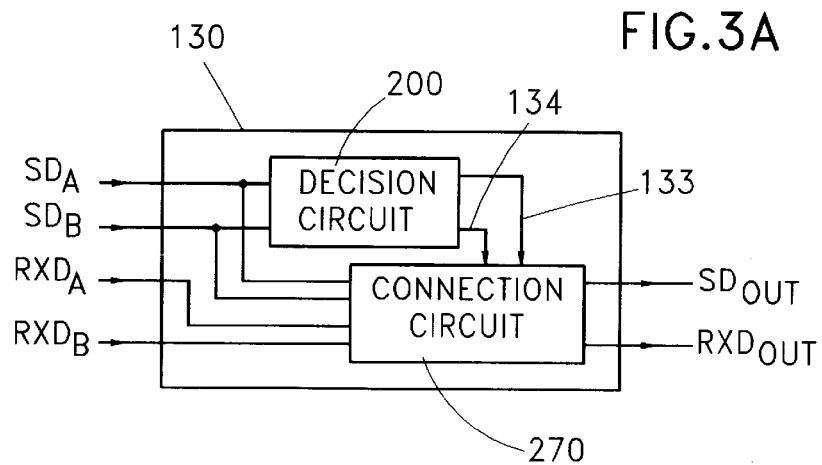
FIG. 3a schematically illustrates the main components of the selector circuit.
Figure 3B:
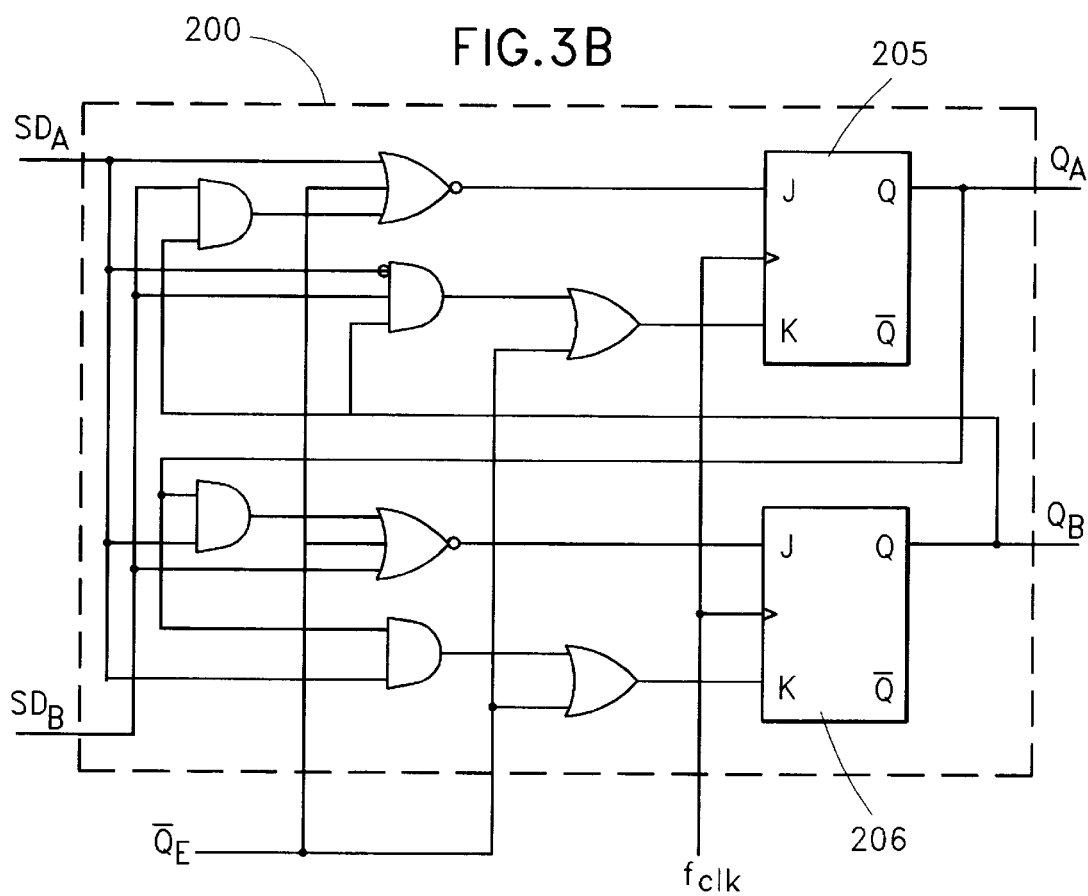
FIG. 3b schematically illustrates a possible implementation of the decision circuit.

In the above suggested approach for connecting the inputs to the output, any subsequent packet P2 that arrives before the end of an already selected packet P1, is essentially wasted. Nevertheless, whatever remains of packet P2 is still forwarded to the AP. This is not an efficient scheme for systems where the uplink packets are rebroadcast into the subcells (e.g. peer-to-peer systems), or in systems where the AP is capable of accepting multiple successive RTS requests from a number of WU's. (These systems will be discussed in further detail in a later subsection.) Suppose a subsequent packet P2 is received on the B input before the end of a packet P1 on the A input. Suppose further that a few microseconds after P1 another packet P3 appears on the A input, then it would be more efficient to let P3 pass through to the AP instead of passing on the remains of P2 which is wasted anyway. To accommodate this more complicated decision/connection procedure, two selector signals, Q$_A$ (133) and Q$_B$ (134), must be provided on the output of the decision circuit (200) in FIG. 3a. The two selector signals are in in turn used as inputs to the connection circuit (270). The logical representation of the connection circuit (270) is now X$_{OUT}$=X$_A$·Q$_A$+X$_B$·Q$_B$ where X is a substitute for either SD or RXD. The decision circuit can be built with two flip-flops, four AND gates, four OR gates and one inverter as shown in FIG. 3b. The Q$_E$ input is used to put the decision circuit into the state of (Q$_A$,Q$_B$)=(0,0) for Q$_E$=0 such that no inputs are connected to the output. This state is denoted as the disable state, and Q$_E$=1 puts the decision circuit into its enable state. When the circuit is initially powered up, it will be in the disable state.

In the above mentioned rebroadcast and multiple RTS systems, it may also be important to monitor the time spacing between successive packets. Suppose two successive packets, P1 and P2, arrive at the AP (or controller in peer-to-peer mode) with P1 arriving first. If P1 and P2 are spaced less than the socalled interframe spacing, the AP (or controller) will not be able to detect the later packet P2. Thus, the notion is that if P1 and P2 are spaced less than the interframe spacing, P2 should not be forwarded to the AP as it is essentially a lost packet. To enforce a minimum time spacing between successive packets, the decision circuit (200) in FIG. 3a can be modified to enter a state where it will start a count down timer (140) every time a packet has been passed on to the output. The modification of the decision circuit (200) includes the addition of a flip-flop and a counter/delay circuit. The connection circuit (270) is unchanged. During count down, the selector outputs (133) and (134) are kept at (Q$_A$,Q$_B$)=(0,0). Thus, the inputs are disconnected from the output. Upon expiration of the timer, the modified decision circuit enters the state (Q$_A$,Q$_B$)=(0,0), which is the same state as the decision circuit (200) is put into when Q$_E$=0. The timer (140) can be adjusted externally to T$_{timer}$=T$_{gap}$.

DOWNLINK: The broadcasting of downlink signals is as follows. The SSDU (100) in FIG. 2 receives a transmit signal, TXD, from the previous SSDU on the TXD$_{IN}$ line (165). The TXD signal originates from the AP. The signal is then split into two paths. One part of the signal is first regenerated in the regenerator (RG) (180) and then passed on to the next SSDU on the TXD$_A$ line (167). Another part of the signal is first processed in the delay element (160) before it is passed on to the TRX unit on the TXD$_B$ line (166). The delay element delays the signal destined for the TRX unit. The purpose and functionality of the delay element is explained in the following. A WU, say (87b) in FIG. 1a, will receive signal contributions from each of the TRX units, TRX$_1$–TRX$_6$, in FIG. 1a. In general, the contributions from the nearest TRX unit will also be the strongest. Thus, when a WU (87b) is right between two TRX units, the WU will receive two signal contributions of comparable strength from TRX$_1$ and TRX$_6$. If no provision is taken, the signal from TRX$_6$ will be delay with the propagation delay in the cables (42–46). Suppose the length of each the cable pieces is 5 m and the cable propagation velocity is 2×10$^8$ m/s, then the total propagation delay in 5 pieces of 5 m cable will be 5×5 m/(2×10$^8$m/s)=125 ns. Considering a 1 Mbps system employing 16-PPM modulation in which the duration of a tick symbol is 250 ns, i.e. the chip-time, the combined signal received by the WU will be severely distorted. One way to compensate for the propagation delay is to delay the TRX transmit signal on the &trxb. line (106) in FIG. 2 in such a fashion that the transmitted signals from all TRX units are transmitted in phase. The delay element (160) in FIG. 2 performs this delay compensation. To ensure that signals are transmitted in a synchronized fashion from all TRX units, the required delay, t$_{D,k}$, to impose on the TXD$_B$ signal (106) destined to the k'th TRX unit can be expressed as $$t_{D,k} = \sum_{j=k}^{N-1} t_{PD,j,j+1}.$$

where N is the last expected TRX unit to be designed for, and tpD,j,j 1, is the propagation delay in the cable between SSDUj and SSDU$_{+1}$. Thus, to accurately compensate for the propagation delay, the cable delays t$_{PD,j,j+1}$ must be known.

In typical infrared wireless infrastructure scenarios, cable delays may range between 25 ns and 1000 ns. Delays of this magnitude can be implemented as shown in FIG. 4. The general idea is to take advantage of the transmit signals preamble sequence in the phase-locked loop (PLL) (300) to quickly phase-lock an oscillator. The phase-locked oscillator signal is in turn used to clock the transmit signal down the chain of flip-flops (320). The delay, t$_{D,k}$, is determined by the number, m, of flip-flops the transmit signal passes through and by the oscillator clock frequency, f$_{clk}$, according to t$_{D,k}$=m(k)/f$_{clk}$ where m(k) is the number of flip-flops required to impose a delay of tD,k on the transmit signal to the k'th TRX unit. m(k) is adjusted by setting the DIP switch (170). For perfect delay compensation, the following equality must be satisfied: t$_{D,k}$=m(k)/f$_{clk}$=

$$\sum_{j=k}^{N-1} t_{PD,j,j+1}.$$

Calculating t$_{D,k}$–t$_{D,k+1}$ yields (m(k)–m(k+1))/f$_{clk}$=t$_{PD,k,k+1}$. This equation shows that the cable propagation delays, t$_{PD,k,k+1}$, must be a multiple of 1/f$_{clk}$. In other words, the length of the cables (41–46) in FIG.(;.la and FIG. 1b must be selected carefully. Suppose the shortest cable between two SSDU's, SSDU$_k$ and SSDU$_{k+1}$, is 5 m. This corresponds to a propagation delay of t$_{PD,k,k+1}$=25 ns. Thus an oscillator frequency of $f_{clk}$=40 MHz is required to provide this minimum delay of 25 ns. If a room requires 6 TRX units to provide uniform coverage, and every two consecutive SSDU's, $SSDU_k$ and $SSDU_{k+1}$, are interconnected with a 5 m cable, then the delay that should be imposed on the transmit signal to the k'th TRX unit is $t_{D,k}$=(6−k)×25 ns. To accommodate this range of delays, i.e. from 0 ns to 125 ns, a minimum of 5 flip-flops is required as each flip-flop can provide a delay of 25 ns. The largest delay of $t_{D,1}$=125 ns to impose on the transmit signal takes place at $SSDU_1$. Note, that if for some reason any of the cables need to be longer than 5 m, then only cable lengths which are a multiple of 5 m should be used.

To simplify the PLL, circuit, and therefore reduce the cost, it is desirable if the relationship between the clock frequency, $f_{clk}$, and the chip-rate, $f_{chip}$, is a power of 2, i.e. $f_{clk}/f_{chip}=2^p$ where p=0,1,2,3, . . . The chip-rate is defined as the inverse of the duration of a tick symbol (i.e. the chiptime). For a 16-PPM 1 Mbps modulation format the chip-rate is $f_{chip}$=4 MHz. For p=3, the clock frequency becomes $f_{clk}$=32 MHz which yields a smallest delay of 31.25 ns. This delay corresponds to a smallest cable length of 6.25 m. Thus, the allowable cable lengths to be employed in the wireless infrastructure are 6.25 m, 12.5 m, 18.75 m, 25.0 m and so forth.

Note that the transmit signal, $TXD_B$, on the output of the delay element is a reconditioned version of the input signal, $TXD_{IN}$, since the delay element essentially samples and subsequently digitizes the input signal at a high sampling frequency. For example, the delay element will eliminate any tails in the waveform of the input signal.

Figure 2:
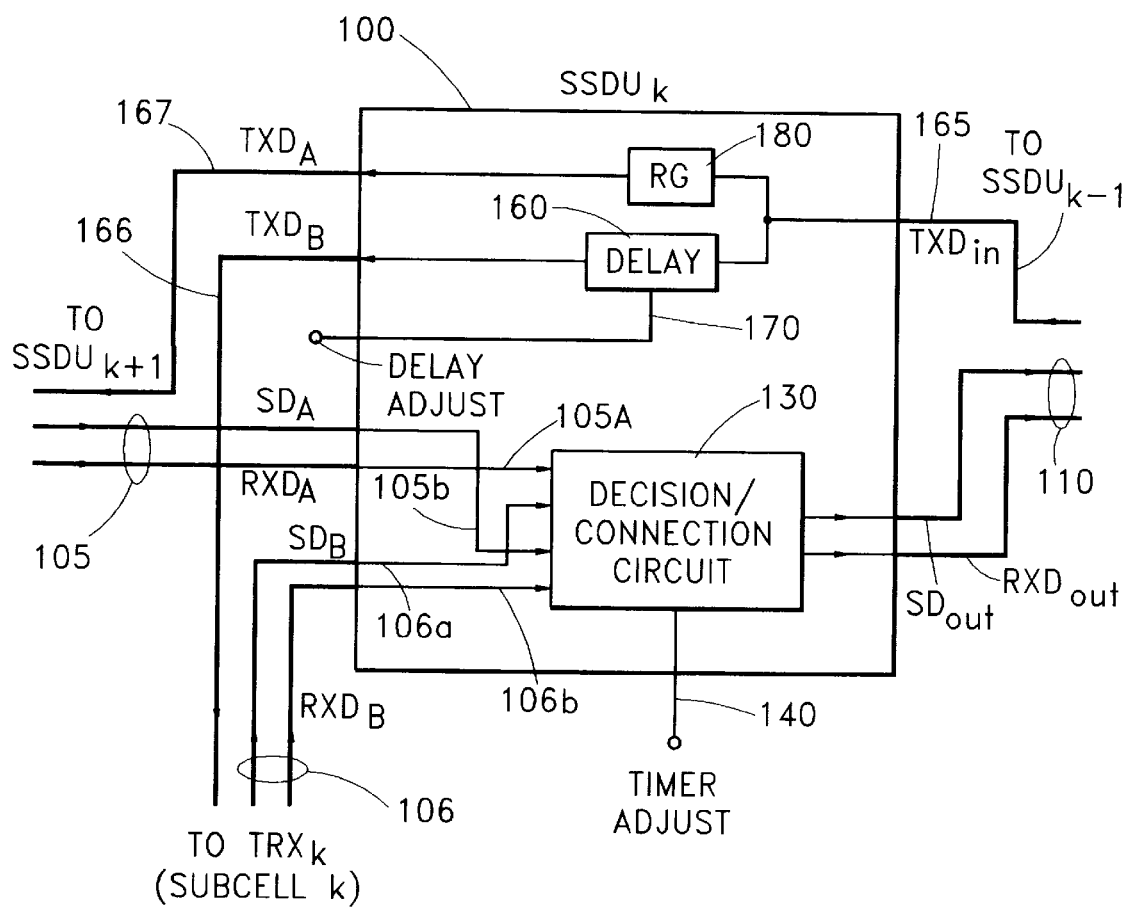
FIG. 2 schematically illustrates the functions of the signal selector and delay unit (SSDU).

Note, that the regenerator (180) in FIG. 2 may simply be a single flip-flop operated in the same fashion as the delay element (160), utilizing the delay elements PLL clock signal, $f_{clk}$, to clock its flip-flop. In fact, the regenerated signal may simply be obtained from the output of the first flip-flop, $FF_1$, in the delay element. The secondary impact on the $TXD_A$ transmit signal (167) is that it will be delayed with a fixed amount of about $1/(2f_{clk})$ at each SSDU. The regenerator could also be a more advanced circuit. It may be worth while to incorporate a counter into the delay circuit to remove possible noise spikes in the input transmit signal. The purpose of the counter would be to count the number of 1's in an incoming tick on the $TXD_{IN}$ input signal. In a perfect pulse there should be 32 MHz/4 MHz=8 1's, in a system with $f_{chip}$=4MHz and $f_{clk}$=32 MHz. Only if more than say 6 1's are detected are the 6 1's considered being a tick, and thus the tick symbol is reproduced. If 6 or less 1's are detected, this is considered a noise spike and the 6 or less 1's are turned into 0's. The later approach may prove necessary after long cables or at branching points such as SSDU (37) in FIG.1c.

HIDDEN NODES: The throughput of a wireless system as shown in FIG. 1a will become increasingly worse as the number of WU's and number of subcells grow. This is partly because the uplink signal from an $WU_1$ (87a) is not seen by WU's in the neighbor subcells. Only those WU's resident in $WU_1$'s own subcell can detect the signal. This is basically a variant of the well known hidden node problem within a single subcell. Since only one TRX at a time is connected to the AP, namely for the duration of the WU's packet, this hidden node problem is somewhat different than the hidden node problem within a single subcell. Firstly, in the multiple subcell case hidden nodes can not cause a collision with $WU_1$'s uplink packets since only one TRX at a time is connected to the AP. Secondly, even though hidden nodes, upon submission of an RTS packet, can cause collision with the AP's downlink data/control packets in their own subcell, this will not affect the reception of these packets at $WU_1$ which is in a collision free subcell (ideally). A potential concern is the much higher probability that an WU from a neighbor subcell, say $WU_2$, may submit a packet P2 at a point in time where another packet P1 is already in process of being transferred to the AP. This is a particularly severe problem in systems which only utilize a DATA/ACK control packet exchange. Suppose a packet P1 originates from a $WU_1$ (87c) in the first subcell (61) in FIG. 1a and suppose the later packet P2 originates from a $WU_2$ (86) in the second subcell (62). As explained in the uplink section, no part of P2 will ever be transmitted to the AP because $SSDU_1$ is busy with P1 as P2 arrives. Suppose now that P2 is a very long packet. Then in essence P2 is preventing packets from any of the subcells (63–66) from being transmitted to the All since $SSDU_2$ is busy with P2 and thus will reject any packets from $SSDU_3$. If on the other hand the WU's in the other subcells, including the second subcell, were alerted about activity on the wireless channel, i.e. that $WU_1$ is sending a packet to the AP, then the packet P2 could not be submitted during P1 and thus P2 would be forwarded to AP and not be rejected by the $SSDU_2$. The alert scheme may be implemented in the following way for systems that use a shared wireless channel.

Let the AP (or controller) send out a narrow-band alert signal throughout the duration of an uplink packet. The alert signal should be such that only WU's can detect it, and it should not interfere with the wireless data channel. Its purpose is to enable the carrier sense in the WU's. To implement this feature requires the addition of a simple narrow-band filter circuit in the WU's receiver.

In peer-to-peer systems, the alert scheme may be supplemented with the following additional feature, let the controller temporarily store the uplink packet. When the controller detects the end of the packet, based on the absence of the signal detect from $SSDU_1$, the packet is released for rebroadcast. In the case of an access point approach, the AP will disable the rebroadcast of the packets if the packet is destined for the wired network. As will become clear from the next subsection, the rebroadcast scheme is not suitable for a multiple RTS system.

Figure 5:
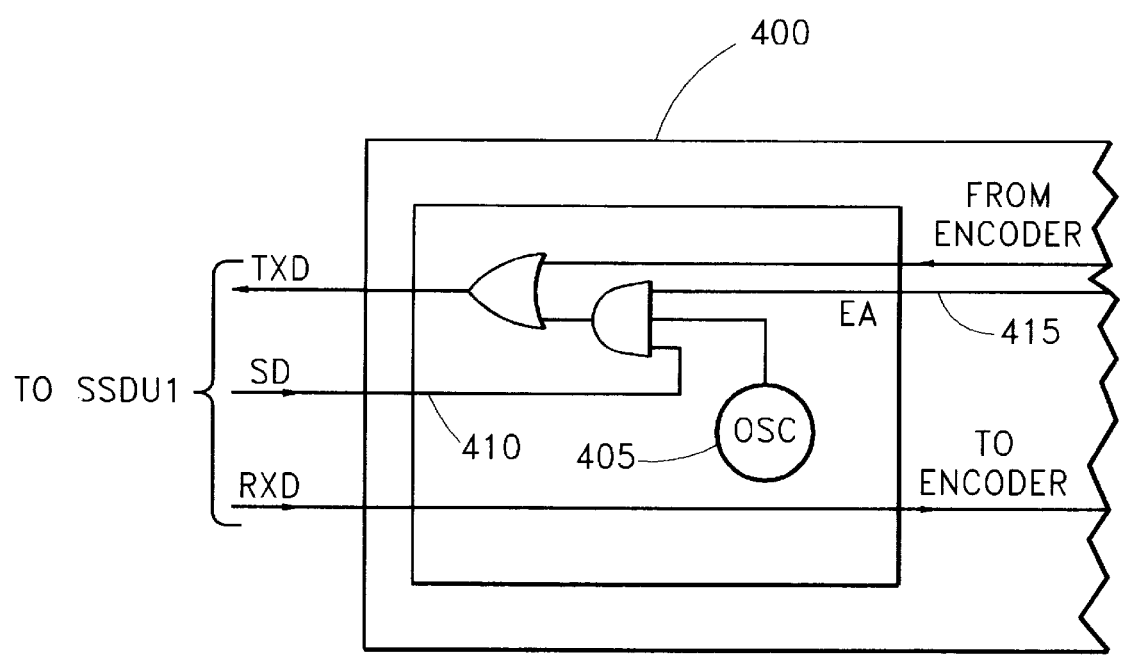
FIG. 5 schematically illustrates a possible implementation of the alert scheme on the base stations circuit board.

FIG. 5 shows a possible implementation of the alert scheme on the AP circuit board (400), or in a controller unit. The oscillator (405) provides the alert signal which is only broadcast if the signal detect line (410) from $SSDU_1$ is enabled, i.e. SD=1, and if the enable alert line (415) from the AP is high, i.e. EA=1. When the AP is broadcasting EA is disabled. The oscillator could provide an 8 MHz signal that will not interfere with the 1 Mbps 16-PPM wireless data channel.

A potential problem with this method is the long propagation delays in an infrastructure as shown in FIG. 1c. Suppose an WU in one of the two subcells in room (93) submits a packet, then the WU's in the other subcell in the room (93) will not receive the alert signal until after two times the propagation delay between the room (93) and the AP (15). This delay in the alert signal can be significantly reduced by incorporating the alert circuit of FIG. 5 in each SSDU. The circuit configuration would be much the same except there would not be an EA line but instead a signal detect circuit which would monitor the $TXD_{IN}$ line (165) in FIG. 2 for broadcast packets from the AP. If broadcast packets are present, the detect circuit will disable the alert signal.

MULTIPLE RTS SYSTEMS: As mentioned in the background section, some systems employ a collision avoidance protocol based on the following exchange of packets: WU sends request-to-send (RTS), AP responds clear-to-send ((CTS), WU sends data packet (DATA), and AP acknowledges data reception (ACK). In systems with a large population of WU's, or where the WU's are very active, the collision avoidance (CA) medium access (MAC) protocol, as described in the background section, may not provide a satisfactory throughput and delay performance. Since the possibility exists with the proposed infrastructure to provide coverage of large areas, it is likely that occasionally there will be a large population of WU's in the coverage area, or that a couple of WU's are significantly stressing the AP. In current RTS based systems, the AP must complete the processing of one RTS request before it can service another RTS request. As will be described in the following, the benefit of enabling the AP to accumulate/service multiple RTS requests is a more orderly/predictable flow of packets, and due to the reduction in the randomness of the packet flow in a multiple RTS system, an improvement in the throughput and delay performance is expected under large traffic conditions. Servicing multiple RTS requests is especially attractive for a large population wireless cell which is divided into a number of subcells as will be explained in the following.

Figure 6:
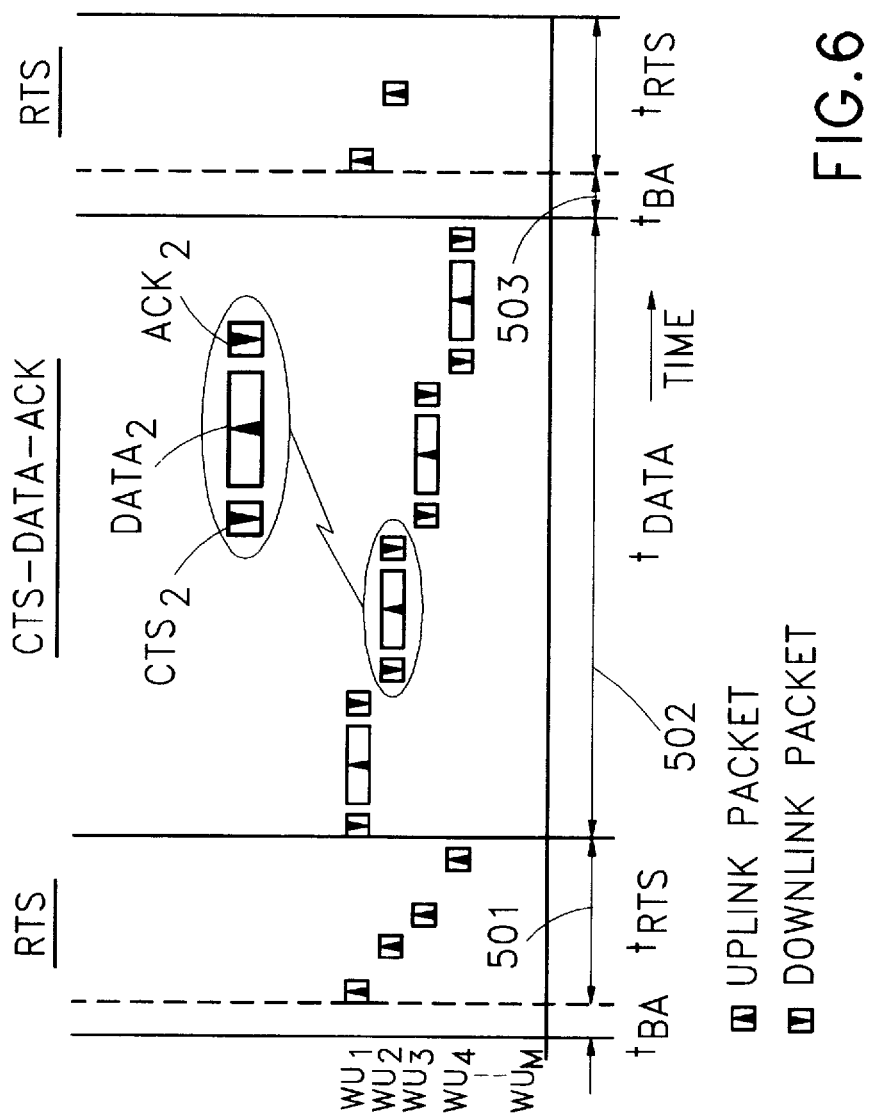
FIG. 6 schematically illustrates an example of the exchange of packets between wireless units (WU) and the base station according to the multiple RTS approach.

The approach is to enable the AP to accumulate multiple received RTS requests ($RTS_1, RTS_2, RTS_3, \ldots$) in a certain well defined time interval, $t_{RTS}$. Denote $RTS_i$ from $WU_i$ as the i'th successfully received RTS request at the AP in the time interval between the first successfully received $RTS_1$, request and the AP's $CTS_1$ response to $WU_i$. Note, that in this context, $WU_i$ is referring to that WU whose RTS request is successfully received as the i'th RTS request at the AP. The concept is schematically presented in FIG. 6 which shows an example of the exchange of control packets (i.e. RTS, CTS, ACK) associated with uplink data packets (DATA). The exchange of packets is divided into three time periods (501), (502), and (503) which are denoted as $t_{RTS}, t_{DATA}$, and $t_{BA}$, respectively. The RTS time window, $t_{RTS}$, (501) is entered upon the first successful reception of an RTS request at the AP. During this interval the AP can queue multiple RTS requests. All WU's are aware that the channel is not available during the transmission of an uplink packet due to the broadcasting of the alert signal as described in the previous section. Combined with the fact that the SSDU's ensures that a packet from only one of the subcells will be forwarded to the AP, even though packets from other subcells may be present, this ensures a more successful reception of RTS requests at the AP. To increase the number of accumulated RTS requests at the AP, the WU's maximum backoff time should be reduced to something smaller than $t_{RTS}$ and/or an WU may be encouraged to submit the same RTS request more than once within $t_{RTS}$. When the RTS time window expires, the data period (502) is entered, the AP submits a CTS response to the first WU whose RTS, the AP received. Upon reception of the CTS, response at $WU_1$, the WU quickly submits its data to the AP. The AP in turn acknowledges the reception of the data by broadcasting the $ACK_1$ response. In immediate succession of $ACK_1$ follows the $CTS_2$ response which prompts $WU_2$ to submit its data. This packet exchange continues until the AP has serviced all the RTS responses. It is assumed that any downlink DATA packets that may accumulate in the AP are also exchanged in the data period (502). (The exchange of any downlink DATA packet and corresponding ACK response from the WU is not shown in 171(i.6.) The data period expires when the last ACK response is broadcast and when the AP has no more data to broadcast. At this point the system enters the pre-RTS time window (503). Under busy conditions, the duration of this window will often be governed by the WU's back-off timer(s). However, if the AP does not receive any signals within a certain minimum response time, the AP itself may use the channel to broadcast data it has received from the wired network in the mean time. When the AP has transmitted this data, the system enters the pre-RTS time window again. Once the first RTS request has been successfully received by the AP, the RTS time window is entered, and only RTS packets from the WU's may be submitted.

Note, that a WU does not know if its RTS packet (or DATA packet) was successfully received by the AP until it receives the CTS response (or the ACK response) from the AP. If it does not receive the CTS response (or the ACK response) before the end of the data period (or immediately after the DATA packet) or, in the event there is no data period, before a given time, it will assume the RTS packet (or the DATA packet) was lost and submit another RTS packet. Furthermore, if the AP does not receive the DATA packet immediately after it has submitted the CTS response, it will suspend servicing the current RTS and jump to submit the next CTS response.

The multiple-RTS protocol in the uplink may have to coexist with an RTS-CTS-DATA-ACK data broadcast packet exchange in the downlink instead of just an DATA-ACK exchange as suggested above. The inclusion of the RTS-CTS packets serves as a probe for the current reliability of the wireless link. The current reliability is of particular importance in the downlink which in general carries most of the traffic. The notion is that if the RTS-CTS exchange is not successful then the DATA-ACK exchange will not be successful either. Thus, the DATA packet is stored for a later try or simply discarded. Since RTS-CTS is typically a 128-byte exchange (it could be smaller) and the DATA-ACK could well be a 1564-byte exchange (or larger), the net result of the probing is an improvement in the channel utilization. This is a particular suitable protocol if the CTS response to an RTS request is immediate, in which case the RTS-CTS-DATA-ACK data broadcast exchange is executed between $ACK_i$ and $CTS_{i+1}$ in the data period.

Having thus described our invention, what we claim as new and desire to secure by Letters Patents is:

1. In a wireless network having a base station which communicates with a plurality of wireless units in a physical coverage area, apparatus for expanding said physical coverage area of said base station, said coverage area having a plurality of subcells, said apparatus comprising:

a. a plurality of transceivers connected in both a downlink direction and an uplink direction to said base station, said transceivers being connected only in the downlink direction through a time delay mechanism for providing respective time delays in the transmission of downlink signals from said base station to said transceivers so that said downlink signals are transmitted from each of said transceivers to said wireless units in phase with each other, each of said transceivers transmitting said downlink signals into a respective one of said subcells and receiving uplink signals from said wireless units located in said respective one subcell, each said transceiver also being connected to a selection unit, said selection units together selecting from among all said wireless units transmitting an uplink signal to said transceivers at any given time a single uplink signal from a single wireless unit in only one subcell so that said selected single uplink and only said selected single uplink signal is received by said base station over an entire duration of said selected single uplink signal irrespective of other uplink signals being transmitted to said transceivers simultaneously by other wireless units.

2. An apparatus as recited in claim 1, wherein each said selection unit selects the received uplink signal that arrives first and blocks all other received uplink signals that arrive later than the selected uplink signal until the selected uplink signal has been completely forwarded to the base station, each said selection unit comprising a pair of inputs, where each of said inputs can receive a signal from one of said subcells, where said each selection unit will forward only one signal from one of said subcells at any given time, and wherein each said selection unit will forward a signal S from one of said inputs if and only if there is no other signal being forwarded from another input when S arrives at said one input of said selection unit.

3. An apparatus as recited in claim 2, wherein said selection unit will forward a signal S from one of said inputs if and only if said signal S arrives at said one input a certain minimum time after another signal has been completely forwarded from any one of said inputs.

4. An apparatus as recited in claim 2 wherein said pair of inputs are simultaneously connected to an output of said selection unit if and only if there is no signal present at any of said inputs and wherein one of said inputs $I_1$ is disconnected from said output if a signal should arrive at the other input $I_2$, and wherein $I_1$ is reconnected to said output when there are no signals present on any of said inputs.

5. An apparatus as recited in claim 2, further comprising means for broadcasting an alert busy signal from said base station to indicate one of said wireless units is currently transmitting an uplink signal when said uplink signal is being transmitted.

6. An apparatus as recited in claim 1, wherein said delay mechanism comprises a plurality of flip-flop circuits connected to each other in a series configuration through a plurality of switches and a clock recovery circuit for generating a clock signal that is synchronized with an input signal of said delay unit, wherein said switches are used to select a desired delay.

7. In a wireless network having a base station which communicates with a plurality of wireless units in a physical coverage area, an apparatus for expanding said physical coverage area of said base station, with said coverage having a plurality of subcells, said apparatus comprising:

a. a plurality of selection units connected to each other in a series configuration along the length of an uplink interconnection extending from said base station;

b. a plurality of transceivers, each transceiver being connected to one of said selection units, and each transceiver transmitting signals to and receiving signals from said wireless units which are in one of said subcells, wherein said series configuration of said selection units will forward to the base station a single uplink signal from only one subcell at any given time, said forwarded uplink signal being an earliest uplink signal transmitted by any one of said wireless units and being forwarded during an entire duration of said earliest uplink signal; and c. a plurality of delay mechanisms, where an output of each of said delay mechanisms is connected to one of said transceivers and where an input of each of said delay mechanisms is connected to a shared downlink interconnect extending from said base station, where each delay mechanism provides delay so that signals transmitted from said base station through said transceivers and to said wireless units will be transmitted from said transceivers in phase with each other.

8. An apparatus as recited in claim 7, wherein said series configuration of said selection units will block any uplink signal that any one of said wireless units begins to transmit to said base station while said earliest uplink signal is being forwarded to said base station, said selection units blocking said any uplink signal for the entire duration of said any uplink signal.

9. In a wireless network having a base station which communicates with a plurality of wireless units in a physical coverage area, an apparatus for expanding said physical coverage area of said base station, with said coverage area having a plurality of subcells, said apparatus comprising:

a. a plurality of selection units connected to each other in a spanning tree configuration, with said base station connected to a root of said tree;

b. a plurality of delay units connected to said base station through said spanning tree configuration; and c. a plurality of transceivers, with each of said transceivers connected to one of said selection units and one of said delay units, each of said transceivers for transmitting and receiving signals to and from wireless units in one of said subcells, each of said selection units forwarding uplink signals towards the root of said tree configuration to said base station from only one of said subcells at a time, said selection units together forwarding to said base station a first uplink signal to be transmitted by a wireless unit after a previous uplink signal has been completely forwarded to said base station and wherein a signal from only one of said subcells can be transmitted to said base station at any given time, and each of said delay units providing delay at each of said transceivers so that a signal broadcasted from said base station through said tree configuration will be transmitted from each of said transceivers to said wireless units in phase with each other.

10. A selector unit for forwarding a first signal to arrive at said selector unit without delay while completely blocking all other signals that arrive at said selector unit while said first signal is being forwarded, said unit comprising:

a. an output;

b. K inputs $I$ through $I_K$;

c. means for providing simultaneous connections from all of said K inputs to said outputs if and only if there are no signals on any of said K inputs;

d. means for disconnecting all of said K inputs except for a j-th input $I_j$ of said K inputs if a signal arrives at said j-th input while there are no signals on any other of said K inputs; and e. means for reconnecting said disconnected inputs $I_1$ through $I_{j-1}$ and $I_{j+1}$ through $I_K$ after said signal on $I_j$ has been completely forwarded to said output, each of said disconnected inputs being reconnected to said output if and only if there is no signal present on said each input and if and only if there is no signal being forwarded to said output on any other of said inputs.

11. An apparatus as recited in claim 10, wherein said inputs are connected to outputs of other selector units and/or to other signal sources and wherein said output is connected to an input of another selector unit or to a base station.

12. An apparatus as recited in claim 10 wherein said selection unit will forward a signal S from one of said K inputs if and only if said signal S arrives at any of said inputs a certain minimum time after another signal has been completely forwarded from one of said inputs.

13. An adjustable delay circuit for regenerating a received digital stream with a desired delay, said circuit comprising:
   a. a plurality of flip-flop circuits connectable to each other in a series configuration;
   b. a clock recovery circuit for generating a clock signal in phase with said digital stream, said clock signal for simultaneously clocking each of said flip-flop circuits; and
   c. a plurality of switches, each of said switches connecting an output of a flip-flop to either an input of a next one of said flip-flops or to an output of said delay circuit, wherein a number of said flip-flop circuits are connected to each other in a series configuration by setting a number of said switches to connect to inputs of said number of flip-flop circuits so as to obtain said desired delay.

14. In a wireless communications network having a plurality of wireless units $WU_1, WU_2, \ldots, WU_M$, capable of communicating with a base station when in a defined coverage area, a method of controlling the flow of signals between said wireless units and said base station of said network, said method comprising:
   a. transmitting a plurality of RTS signals from a number of said wireless units to said base station within a predefined time period, each said RTS signal indicating a request to transmit data signals or control signals from a corresponding one of said wireless units;
   b. storing those of said plurality of RTS signals which are received by said base station;
   c. sequentially transmitting a plurality of CTS signals from said base station, each said CTS signal indicating that one of said wireless units may transmit a data signal or a control signal to said base station, wherein each of said CTS signals is immediately followed by the transmission of a data signal or a control signal from one of said wireless units until each of said number of wireless units has transmitted at least one data signal or one control signal to said base station in accordance with said RTS signals.

15. In a wireless communications network having a plurality of wireless units $WU_1, WU_2, \ldots, WU_M$, capable of communicating with a base station when in a defined coverage area, a method of controlling the flow of signals between said wireless units and said base station of said network, said method comprising:
   a. transmitting a plurality of RTS signals from a number of said wireless units to said base station within a predefined time period $T_{RTS}$, each said RTS signal indicating a request to transmit a DATA packet from a corresponding one of said wireless units;
   b. storing those of said plurality of RTS signals which are received by said base station;
   c. transmitting a CTS signal from said base station after said time period $T_{RTS}$ in response to one of said received RTS signals, said CTS signal indicating that one of said wireless units may transmit a DATA packet to said base station;
   d. transmitting said DATA packet from said one wireless unit;
   e. transmitting from said base station an ACK signal to said wireless unit immediately followed by another CTS signal, said ACK signal indicating that said DATA packet was received and said other CTS signal indicating that one of said wireless units may transmit a DATA packet to said base station; and
   f. repeating step (e) for each RTS signal stored in said base station until all said DATA packets indicated by said stored RTS signals have been transmitted to said base station.

16. In a wireless communications network having a plurality of wireless units $WU_1, WU_2, \ldots, WU_M$, capable of communicating with a base station when in a defined coverage area, a method of controlling the flow of signals between said wireless units and said base station of said network, said method comprising:
   a. transmitting a plurality of RTS signals from a number of said wireless units to said base station within a predefined time period $T_{RTS}$, each said RTS signal indicating a request to transmit a DATA packet from a corresponding one of said wireless units;
   b. storing those of said plurality of RTS signals which are received by said base station;
   c. transmitting a CTS signal from said base station after said time period $T_{RTS}$ in response to one of said received RTS signals, said CTS signal indicating that one of said wireless units may transmit a DATA packet to said base station;
   d. transmitting said DATA packet from said one wireless unit;
   e. transmitting from said base station an ACK signal to said wireless unit immediately followed by another CTS signal, said ACK signal indicating that said DATA packet was received and said other CTS signal indicating that one of said wireless units may transmit a DATA packet to said base station;
   f. repeating step (e) for each RTS signal stored in said base station until all said DATA packets indicated by said stored RTS signals have been transmitted to said base station,
   said method further comprising transmitting an RTS signal to a wireless unit, said wireless unit responding by transmitting a CTS signal to said base station, said base station responding by transmitting a DATA packet to said wireless unit, said wireless unit responding by transmitting an ACK signal to said base station and wherein this exchange of RTS CTS DATA and ACK signals occur outside of said time period $T_{RTS}$.

17. A method as recited in claim 16, further comprising periodically transmitting control signals from said base station to said wireless units, said control signals setting the duration of said time period $T_{RTS}$ and indicating the number of times a wireless unit may submit the same RTS signal within said time period $T_{RTS}$.

18. In a wireless communications network having a plurality of wireless units $WU_1, WU_2, \ldots, WU_M$, capable of communicating with a base station when in a defined coverage area, an apparatus for controlling the flow of signals between said wireless units and said base station of said network, said apparatus comprising:
   a. means for transmitting a plurality of RTS signals from a number of said wireless units to said base station within a predefined time period, each said RTS indicating a request to transmit data signals or control signals from a corresponding one of said wireless units;
   b. means for storing those of said plurality of RTS signals which are received by said base station;
   c. means for sequentially transmitting a plurality of CTS signals from said base station, each said CTS signal indicating that one of said wireless units may transmit a data signal or a control signal to said base station, wherein each of said CTS signals is immediately followed by the transmission of a data signal or a control signal from one of said wireless units until each of said number of wireless units has transmitted at least one data signal or one control signal to said base station in accordance with said RTS signals.

* * * * *